(12) United States Patent
Lieske

(10) Patent No.: US 9,996,500 B2
(45) Date of Patent: Jun. 12, 2018

(54) APPARATUS AND METHOD OF A CONCURRENT DATA TRANSFER OF MULTIPLE REGIONS OF INTEREST (ROI) IN AN SIMD PROCESSOR SYSTEM

(75) Inventor: Hanno Lieske, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 823 days.

(21) Appl. No.: 14/347,619

(22) PCT Filed: Sep. 27, 2011

(86) PCT No.: PCT/JP2011/072715
§ 371 (c)(1),
(2), (4) Date: Mar. 26, 2014

(87) PCT Pub. No.: WO2013/046475
PCT Pub. Date: Apr. 4, 2013

(65) Prior Publication Data
US 2014/0237214 A1    Aug. 21, 2014

(51) Int. Cl.
*G06F 15/80*    (2006.01)
*G06F 9/345*    (2018.01)
(Continued)

(52) U.S. Cl.
CPC .......... *G06F 15/8015* (2013.01); *G06F 9/345* (2013.01); *G06F 9/383* (2013.01);
(Continued)

(58) Field of Classification Search
CPC .................................................. G06F 9/3887
See application file for complete search history.

(56) References Cited

U.S. PATENT DOCUMENTS 5,239,512 A * 8/1993 Fautier ...................... G06T 1/60
                                                    365/230.01
5,999,161 A * 12/1999 Kajimoto ................ G06T 9/007
                                                    345/24

(Continued)

FOREIGN PATENT DOCUMENTS

JP        H 4-333952 A      11/1992
JP        2013-25563 A       2/2013

OTHER PUBLICATIONS

International Search Report (ISR) (PCT Form PCT/ISA/210), in PCT/JP2011/072715, dated Feb. 7, 2012.
(Continued)

*Primary Examiner* — Tim T Vo
*Assistant Examiner* — Herve Iradukunda
(74) *Attorney, Agent, or Firm* — McGinn IP Law Group, PLLC

(57) ABSTRACT

This present invention provides a fast data transfer for a concurrent transfer of multiple ROI areas between an internal memory array and a single memory where each PE can specify the parameter set for the area to be transferred independently from the other PE. For example, for a read transfer, the requests are generated in a way that first the first element of each ROI area is requested from the single memory for each PE before the following elements of each ROI area are requested. After the first element from each ROI area has been received from the single memory in a control processor and has been transferred from the control processor over a bus system to the internal memory array, all elements are in parallel stored to the internal memory array. Then, the second element of each ROI area is requested from the single memory for each PE. The transfer finishes after all elements of each ROI area are transferred to their assigned PEs.

20 Claims, 18 Drawing Sheets

(51) Int. Cl.
G06F 9/38 (2018.01)
G06F 15/167 (2006.01)
G06T 1/60 (2006.01)

(52) U.S. Cl.
CPC .......... *G06F 9/3887* (2013.01); *G06F 15/167* (2013.01); *G06T 1/60* (2013.01); *G06F 2211/002* (2013.01)

(56) References Cited

U.S. PATENT DOCUMENTS

| | | | | |
|---|---|---|---|---|
| 2001/0041012 A1* | 11/2001 | Hsieh | ............ | G06F 7/76 382/234 |
| 2003/0140212 A1 | 7/2003 | Stein et al. | | |
| 2008/0209165 A1* | 8/2008 | Ozaki | ............ | G06F 9/30014 712/22 |
| 2009/0046953 A1* | 2/2009 | Bink | ............ | H04N 19/119 382/307 |
| 2009/0164752 A1* | 6/2009 | McConnell | ....... | G06F 15/17337 712/16 |
| 2010/0088489 A1* | 4/2010 | Lieske | ............ | G06F 15/8007 712/20 |
| 2010/0141668 A1 | 6/2010 | Gehrke et al. | | |
| 2011/0173416 A1 | 7/2011 | Noda et al. | | |
| 2013/0024658 A1 | 1/2013 | Kyo | | |

OTHER PUBLICATIONS

Sek M. Chai et al: "Streaming I/O for Imaging Applications" Computer Architecture for Machine Perception, 2005. Camp 2005. Proceedings. Seventh International Workshop on Palermo, Italy Jul. 4-6, 2005, Piscataway, NJ, USA, IEEE, Los Alamitos, CA, USA, Jul. 4, 2005 (Jul. 4, 2005, pp. 178-183, XPOI0835502, ISBN: 978-0-7695-2255-5.

Koga T et al: "A 51.2-GOPS scalable video recognition processor for intelligent cruise control based on a linear array of 128 four-way VLIW processing elements", IEEE Journal of Solid-State Circuits, IEEE Service Center, Piscataway, NJ, USA, vol. 1. 38, No. 11, Nov. 1, 2003 (Nov. 1, 2003), pp. 1992-2000, XP011102789, ISSN: 0018-9200, DOI: 10.1109/JSSC.2003.818128.

Shohei Nomoto et al: "Performance Evaluation of a Dynamically Switchable SIMD/MIMD Processor by Using an Image Recognition Application", IPSJ Transactions on System LSI Design Methodology, Information Processing Society of Japan, JP, vol. 3, Feb. 1, 2010 (Feb. 1, 2010), pp. 47-56, XP002663311, ISSN: 1882-6687, DOI:10.2197/IPSJTSLDM.3.47.

Shorin Kyo, et.al., "A 51.2GOPS Scalable Video Recognition Processor for Intelligent Cruise Control Based on a Linear Array of 128 4-Way VLIW Processing Elements", 2003 IEEE International Solid-State Circuits Conference, Feb. 2003.

Taiwanese Office Action dated Feb. 25, 2016 with an English translation thereof.

Japanese Office Action dated Mar. 17, 2015 with an English translation thereof.

* cited by examiner

APPARATUS AND METHOD OF A CONCURRENT DATA TRANSFER OF MULTIPLE REGIONS OF INTEREST (ROI) IN AN SIMD PROCESSOR SYSTEM

TECHNICAL FIELD

The present invention relates to a data transfer between a single memory and an array of memories in a single instruction multiple data (SIMD) processor system. More particularly, it relates to a fast data transfer with small implementation costs for a concurrent transfer of multiple regions of interest (ROI) areas where each processing element (PE) of the SIMD processor system specifies the parameter set for its assigned ROI area to be transferred independently from the other PEs.

BACKGROUND ART

Processors that operate in a single instruction multiple data (SIMD) style have been developed because SIMD processing systems have great potential for achieving high speed parallel processing more efficiently. When processing e.g. a pedestrian or white line detection algorithm in the SIMD processor system, in a first step, possible candidate areas are detected and in a following step, these candidate areas are verified. To use the processing power of the SIMD processor system optimally, the PE array can be utilized not only for the possible candidate area detection in the first step but also for the verification of the ROI areas. Therefore, each ROI area has to be loaded to the internal memory of each PE, so that the same algorithm can be executed on the PE array with different assigned ROI areas for each PE.

However, due to the fact that the processing elements are operating in SIMD style, all processing elements except for a single PE have to wait when loading the ROI area for the single PE, which reduces the possible gain of the SIMD style processing compared to e.g. a sequential processing of each ROI area in the central processor (CP).

An example of the SIMD processor is shown in the prior art NPTL 1. FIG. 13 is showing the architecture of the processor. The architecture consists of an array of processing elements (PEs) 104. The array is composed of PEs 101 with internal memory 102, which are grouped into group of PE with internal memory 103. Data is transferred between the internal memory array and an external memory (EMEM) 108 over a bus 105. Line buffers 106 are arranged over the bus 105 in such a way that between two line buffers either a group of PE or a control processor 107 is connected to the bus 105.

FIG. 14 shows the operation of the line transfer, where an autonomous DMA operation is used in NPTL 1 for the data transfer between internal and external memory in SIMD mode. For a transfer from the internal memories to the external memory 108, e.g., one element row 201, which holds from each PE one element equal to 1 byte, is first read from the internal memories in parallel and stored inside the line buffers 106 of the bus 105. Then, the content of the line buffers 106 of the bus 105 are shifted out to the external memory 108 before the following row 202 is read from the internal memories.

For the data transfer between the internal memories and the external memory 108, always whole element rows are transferred.

If only a part is needed to be transferred, a masking operation is used for the write operation to the EMEM 108.

In that case, the write action should be suspended for the data elements of some PEs though data could be read and transferred for each PE.

To process multiple ROI areas in such kind of architecture, there exist two possibilities.

Firstly, the processing is purely done in the CP. In this case, the ROI areas are sequentially transferred and executed one after each other while the PE array is not utilized.

This takes a large amount of time while the DMA is ineffective and the processing power of the PE array is unused.

Secondly, the processing is done in the PE array. Here, the processing could be done in parallel utilizing the SIMD parallelism.

However, because the unarranged data in EMEM cannot be loaded in parallel with the existing line transfer operation, this data transfer is executed sequentially by transferring the data element wise to each processing element masking out the other processing elements.

That is, all PE except for a single PE are masked so that the assigned ROI data can be written in only the single internal memory of the single PE while other PEs are masked.

But every PE has to be accessed element by element while the other PEs are not accessed, which leads that it takes much longer time to transfer the data for all PE.

Here, we would like to show one more example that is described in a patent application filed by the same applicant.

Japanese patent application No. 2011-159752 filed on Jul. 21, 2011 (patent literature 1) describes new idea to transfer data more efficiently using SIMD processor.

Referring FIG. 15, we assume the case that BK1-BK6 are ROIs that should be transferred to each assigned PE and BK1-BK6 have different size each other.

In this case, a DMA controller uses as transfer parameters the maximum value of each ROI parameter.

In FIG. 15, BK2 has the maximum height ($L_{max}$) and BK5 has the maximum width ($W_{max}$).

Once the CP sets start addresses of each region to the DMA controller, as shown in FIG. 16, $L_{max} \times W_{max}$ size regions can be transferred to each PEs respectively in parallel processing by the DMA controller.

CITATION LIST

Patent Literature

PTL 1: Japanese patent application No. 2011-159752 filed on Jul. 21, 2011

Non Patent Literature

NPL 1: Shorin Kyo, et.al., "A 51.2GOPS Scalable Video Recognition Processor for Intelligent Cruise Control Based on a Linear Array of 128 4-Way VLIW Processing Elements", 2003 IEEE International Solid-State Circuits Conference, Feb. 2003

SUMMARY OF INVENTION

Technical Problem

While the data transfer works for the transfer of independent for each PE defined ROI data areas in the way described in NPL 1, the data transfer takes a large amount of time due to the fact that the data for each PE has to be transferred separately masking out the write action for all other PE.

This time overhead for the element wise data transfer makes the SIMD mode unfeasible for many tasks, like, e.g., for the verification task of a pedestrian or white line detection algorithm.

If using the technology described in the PTL1, in addition to BK1-BK6 which are necessary ROI data, needless and redundant data also must be transferred, which makes data transfer time much larger than necessary and requires larger areas on internal side for data storage.

Solution of Problem

The goal of this present invention is to provide a fast data transfer with small implementation costs for a concurrent transfer of multiple ROI areas between an internal memory array and a single memory where each PE can specify the parameter set for the area to be transferred independently from the other PE.

Also the goal of this present invention to reduce the time for the data transfer is reached by transferring at the beginning of the data transfer instruction the parameter set of each ROI area from the assigned PE to the control processor and storing this parameter set into the control processor.

Then, inside the control processor, multiple requests to the single memory are autonomously generated for each PE and each element of each ROI area.

For a read transfer, the requests are generated in a way that first the first element of each ROI area is requested from the single memory for each PE before the following elements of each ROI area are requested. After the first element from each ROI area has been received from the single memory in the control processor and has been transferred from the control processor over the bus system to the internal memory array, all elements are in parallel stored to the internal memory array.

Then, the second element of each ROI area is requested from the single memory for each PE. The transfer finishes after all elements of each ROI area are transferred to their assigned PEs.

For a write transfer, the requests are generated in a way that first the first element of each ROI area inside each PE is read in parallel from the internal memory array and transferred to the registers of the bus system. Then, the data elements are shifted to the control processor, where for each element the corresponding single memory address is calculated and a data transfer is requested to the single memory. After sending all first elements to the single memory, the second element from each ROI area is read from the internal memory array.

DESCRIPTION OF EMBODIMENTS

Figure 1:
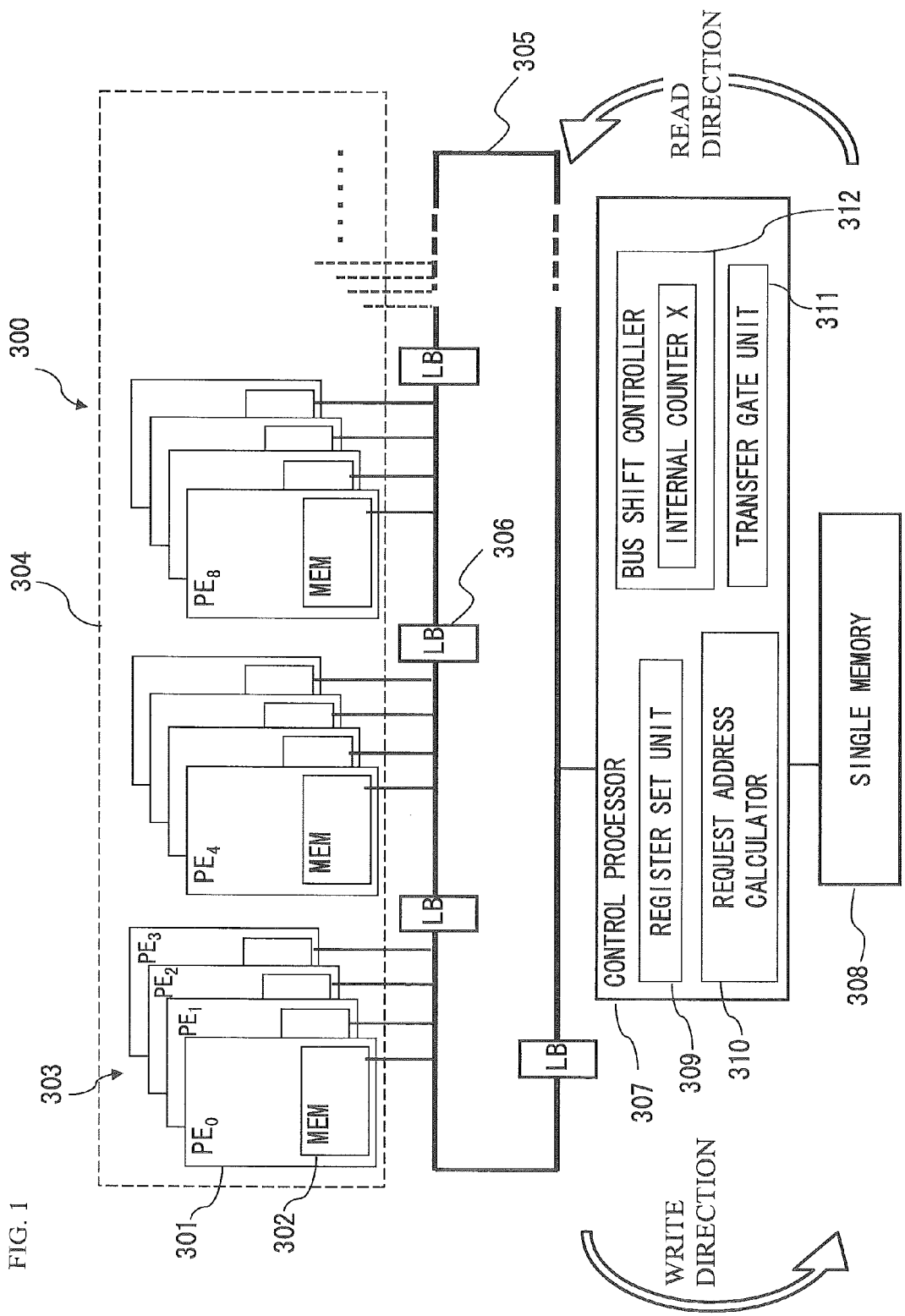
FIG. 1 shows the structure of a SIMD processor of the first embodiment of the present invention.
Figure 2:
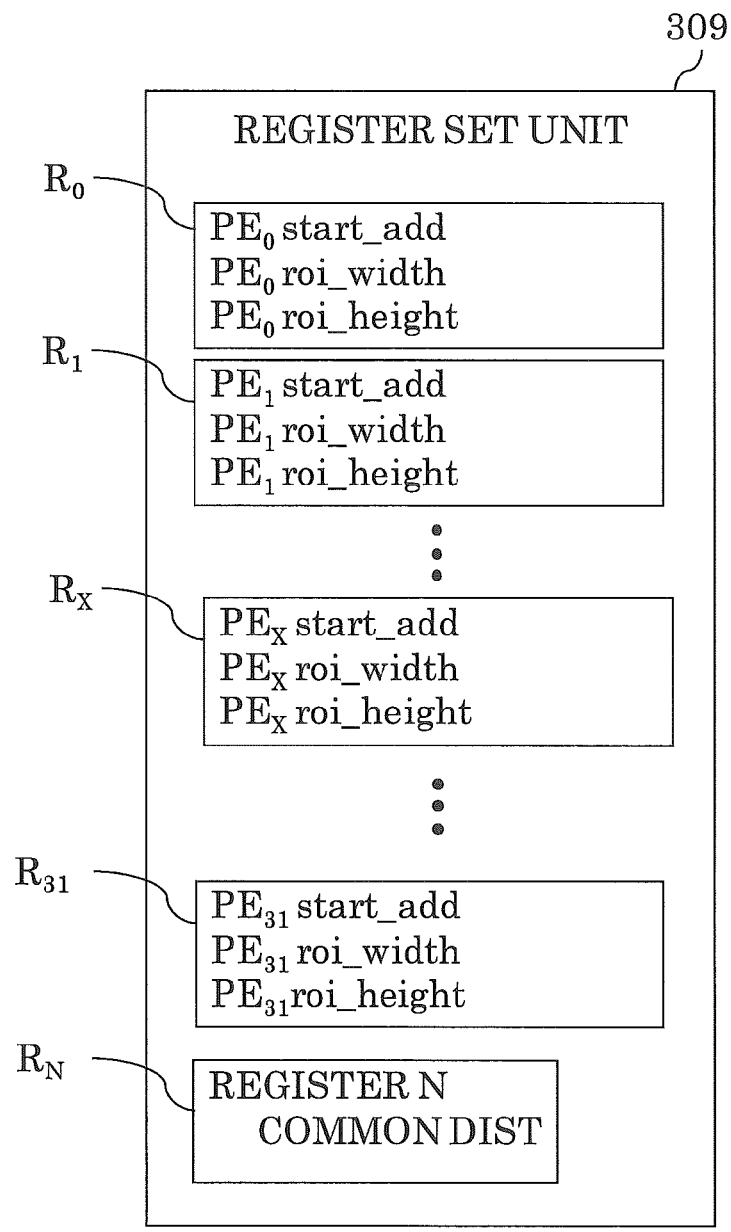
FIG. 2 shows the register set 309 in more detail.

With reference to the accompanying drawings, exemplary embodiments of the present invention will be described.
(First Embodiment)
As a first embodiment, transfer of ROI data from the single memory to the memory array will be described.
This situation may happen when after some possible candidates of white line or face region are detected then verification is needed.
FIG. 1 shows the structure of a SIMD processor of the first embodiment of the present invention.
The SIMD processor has an array 304 of PEs 301, each PE 301 having its own internal memory 302. Hereinafter we call internal memories of the PE array 304 as an internal memory array. Moreover, some PEs are grouped into group 303 of PEs. In this embodiment, four PEs are grouped as one unit.
Data is transferred between the internal memory array and the single memory 308 over a bus system 305 and data transfer is controlled by a control processor (CP) 307. The central processor (CP) 307 works as a Direct Memory Access Controller utilizing SIMD parallelism. Line buffers 306 are arranged over the bus system 305 in such a way that between two line buffers either a group 303 of PEs or the control processor 307 is connected to the bus 305.
The control processor 307 has a register set 309, a request address calculator 310, a transfer gate unit 311 and a bus shift controller 312.
FIG. 2 shows the register set 309 in more detail.
The register set 309 has a number of registers $R_0$-$R_{N-1}$. One register is for one PE, that is, register $R_0$ holds a parameter set of PE0, register $R_1$ holds a parameter set of PE1, register $R_{N-1}$ holds a parameter set for $PE_{N-1}$. Each register $R_0$-$R_{N-1}$ only holds transfer parameters, which are different between the PEs.
These parameters are:
1. ROI start address in the single memory: start_$add_{single\_memory}$
2. ROI width: roi_width
3. ROI height: roi_height The accessed addresses during the transfer operation are generated in the request address calculator 310.

Figure 3:
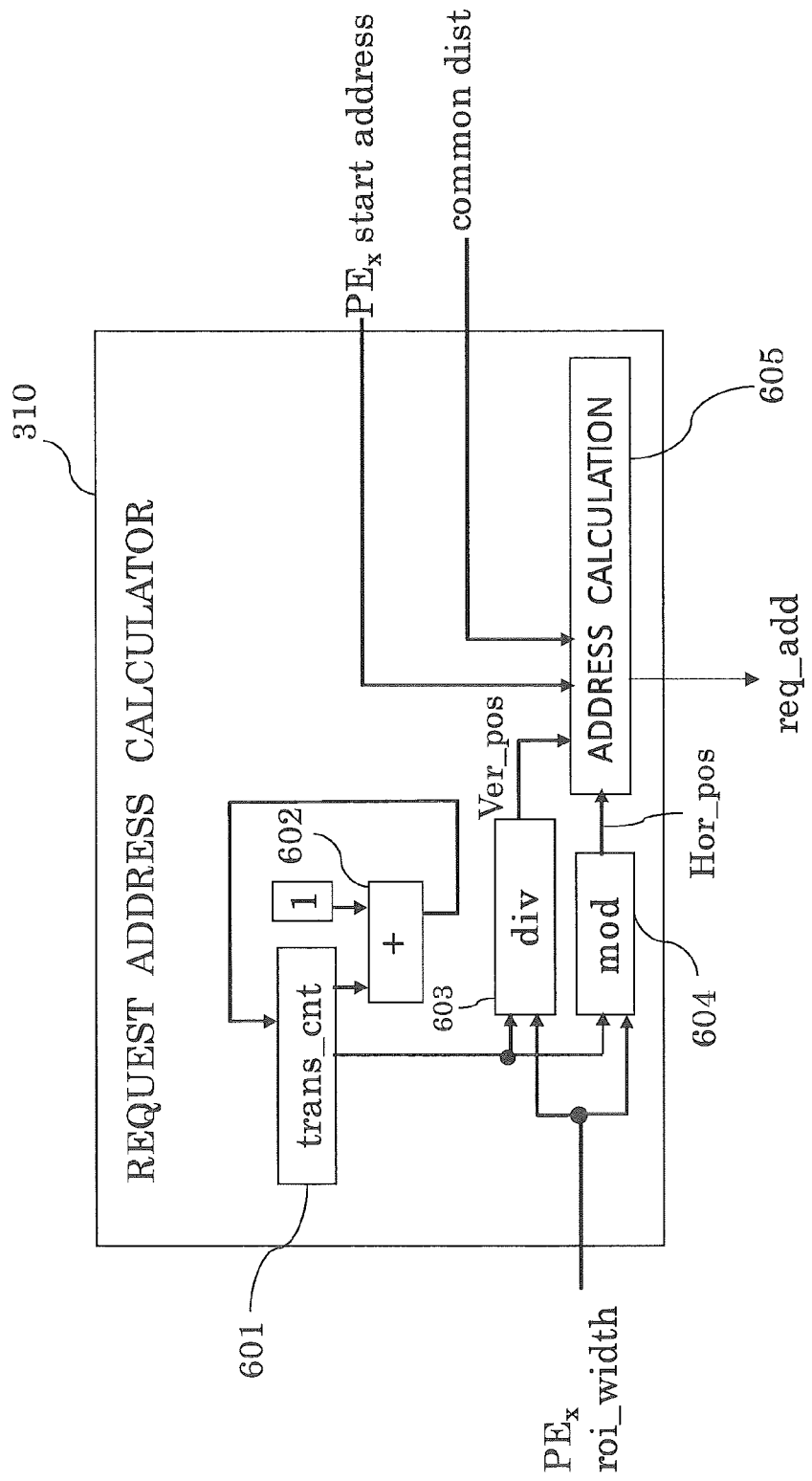
FIG. 3 shows the request address calculator 310 in more detail.

FIG. 3 shows the request address calculator 310 in more detail.

The request address calculator 310 has a transfer counter 601, an adder unit 602, a division unit 603, a modulo operation unit 604 and an address calculation unit 605. The transfer counter 601 counts the number of transfer (trans_cnt) that is increased by one using the adder unit 602.

The division unit 603 executes an integer division in which the trans_cnt is divided by the roi_width and its quotient is output to the address calculation unit 605.

Figure 4:
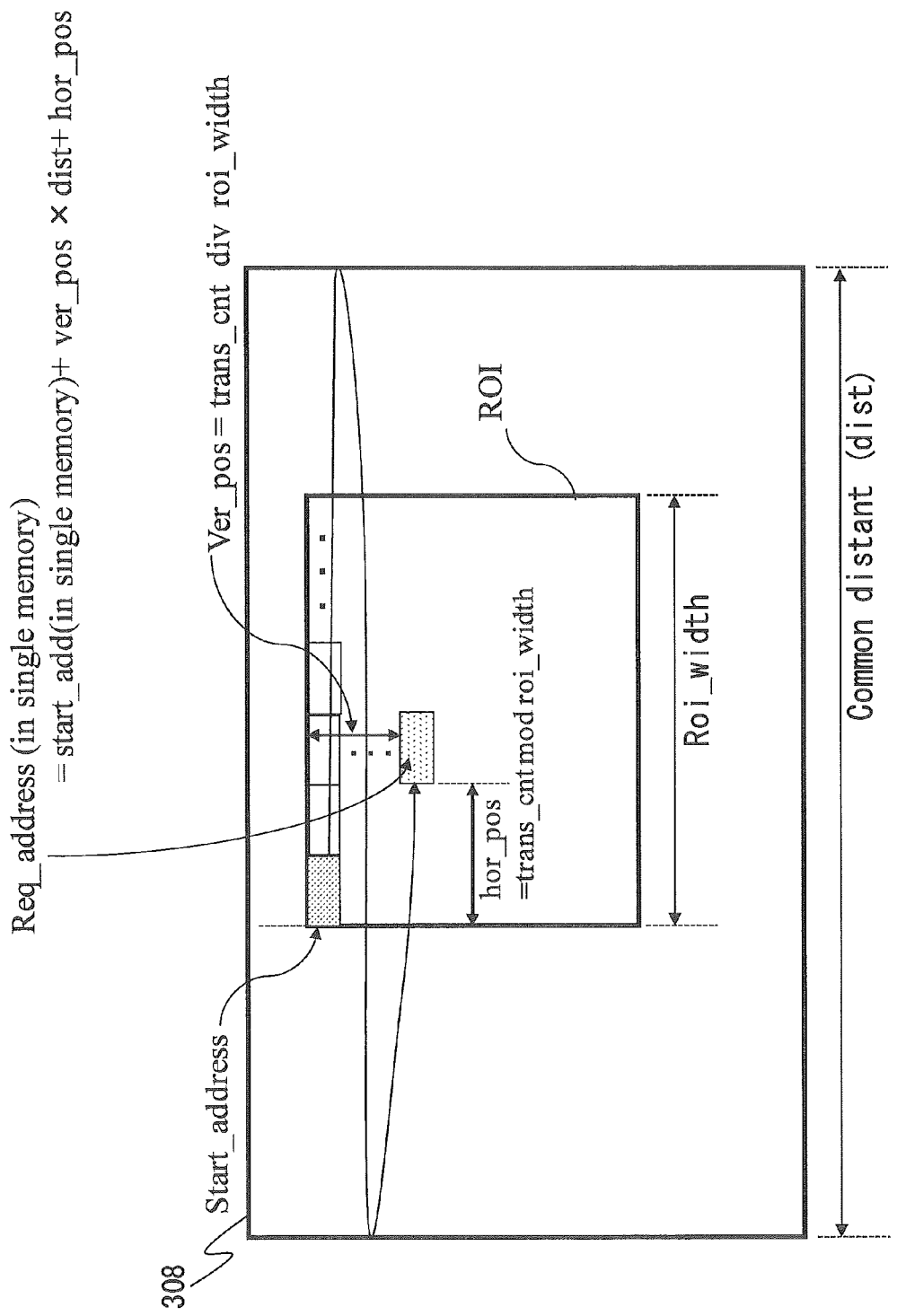
FIG. 4 illustrates the meaning of ver_pos and hor_pos.

As shown in FIG. 4, said quotient stands for a data's vertical position ver_pos inside a ROI.

$$ver\_pos = trans\_cnt \ div \ roi\_w$$

The modulo operation unit 604 executes modulo operation in which the trans_cnt is divided by the roi_width and its remainder is output to the address calculation unit 605.

As shown in FIG. 4, said remainder stands for a data's horizontal position hor_pos inside a ROI.

$$hor\_pos = trans\_cnt \ mod \ roi\_w$$

Hence the ver_pos and the hor_pos determine the position of data to be transferred inside the ROI.

The address calculation unit 605 calculates the request address inside the single memory $req\_add_{single\_memory}$.

In addition to said ver_pos and said hor_pos, a start address start_add, and a common distance dist are also provided to the address calculation unit 605.

Here, the start address start_add is a start address of the ROI inside the single memory 308, and the common distance is the width of memory region of the single memory.

So the address calculation unit 605 calculates the following equation.

$$req\_add_{single\_memory} = start\_add_{single\_memory} + (ver\_pos \times dist) + hor\_pos$$

Referring to FIG. 4, the meaning of the above equation is clearly understandable.

Figure 5:
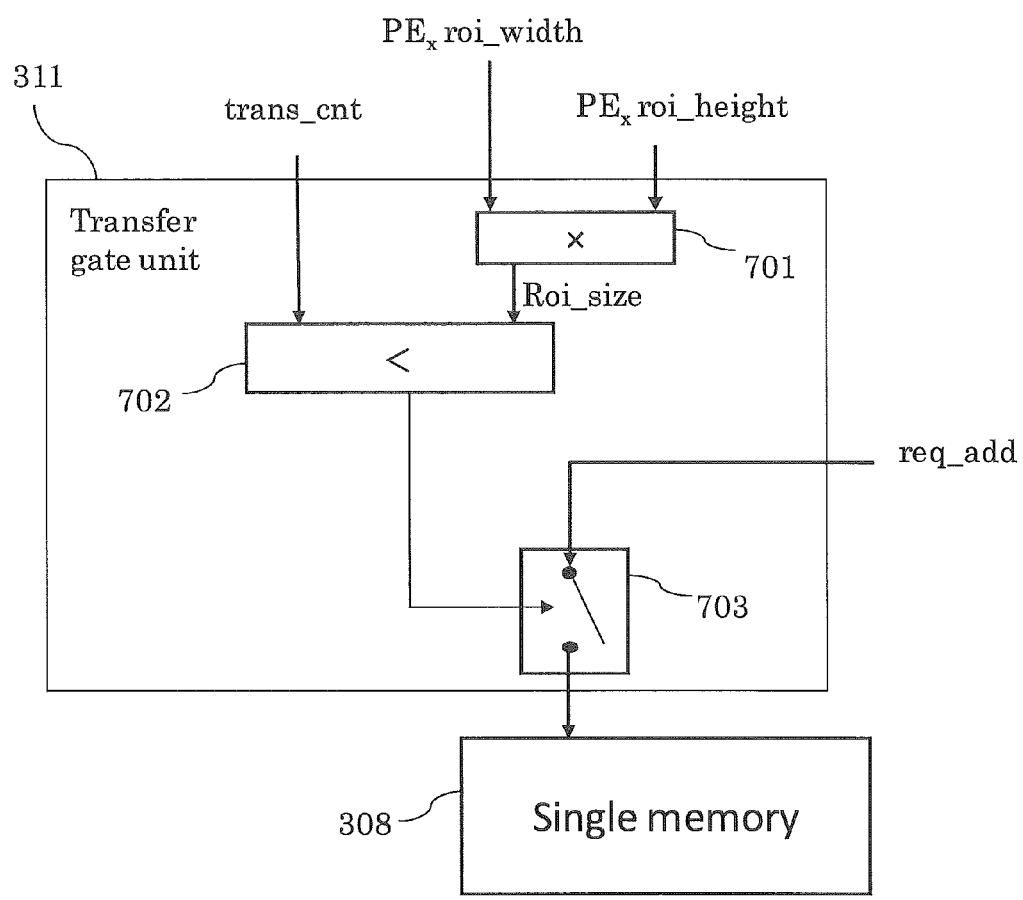
FIG. 5 shows the transfer gate unit 311 in detail.

FIG. 5 shows the transfer gate unit 311 in detail.

The transfer gate unit 311 has a multiplication unit 701, a comparator 702 and a switch 703. The multiplication unit 701 multiplies PEx roi_width by PEx roi_height and thereby obtains PEx ROI size roi_size. Said roi_size is output to the comparator 702.

In addition to said roi_size, the trans_cnt is provided to the comparator 702 from the transfer counter 601. The comparator 702 compares trans_cnt to said roi_size. The result of the comparison is output to the switch 703.

The switch is an ON/OFF two state switch and, according to the result of the comparison by the comparator, transfers the request address $req\_add_{single\_memory}$ to the single memory 308.

When the trans_cnt is less than the roi_size, i.e. trans_cnt<roi_size, the switch 703_allows passage of the $req\_add_{single\_memory}$ to the single memory 308; on the contrary, when the trans_cnt reaches or goes over the roi_size, i.e. trans_cnt≥roi_size, the switch 703 blocks the passage of the $req\_add_{single\_memory}$ to the single memory 308.

In other words, until the number of the data transfer catches or exceeds the ROI size, necessary request addresses are provided to the single memory 308, but needless request addresses are not provided to the single memory 308.

The bus shift controller 312 controls bus shift. The bus shift controller 312 has an internal counter that counts the number of the transferred element. In this embodiment, the bus shift controller 312 calculates modulo 4 arithmetic (×mod 4) and the bus is shifted by one according to the result of the modulo arithmetic. In this embodiment, four PEs are grouped and one line buffer is capable of holding four elements. For example, when one element is 4 byte, the bus line 305 and line buffer LB have 16 byte capacity. Therefore, the bus system should be shifted every four elements.

(Data Transfer Operation for Read Direction)

Next we would like to describe the data transfer operation referring to flowcharts.

Figure 6A:
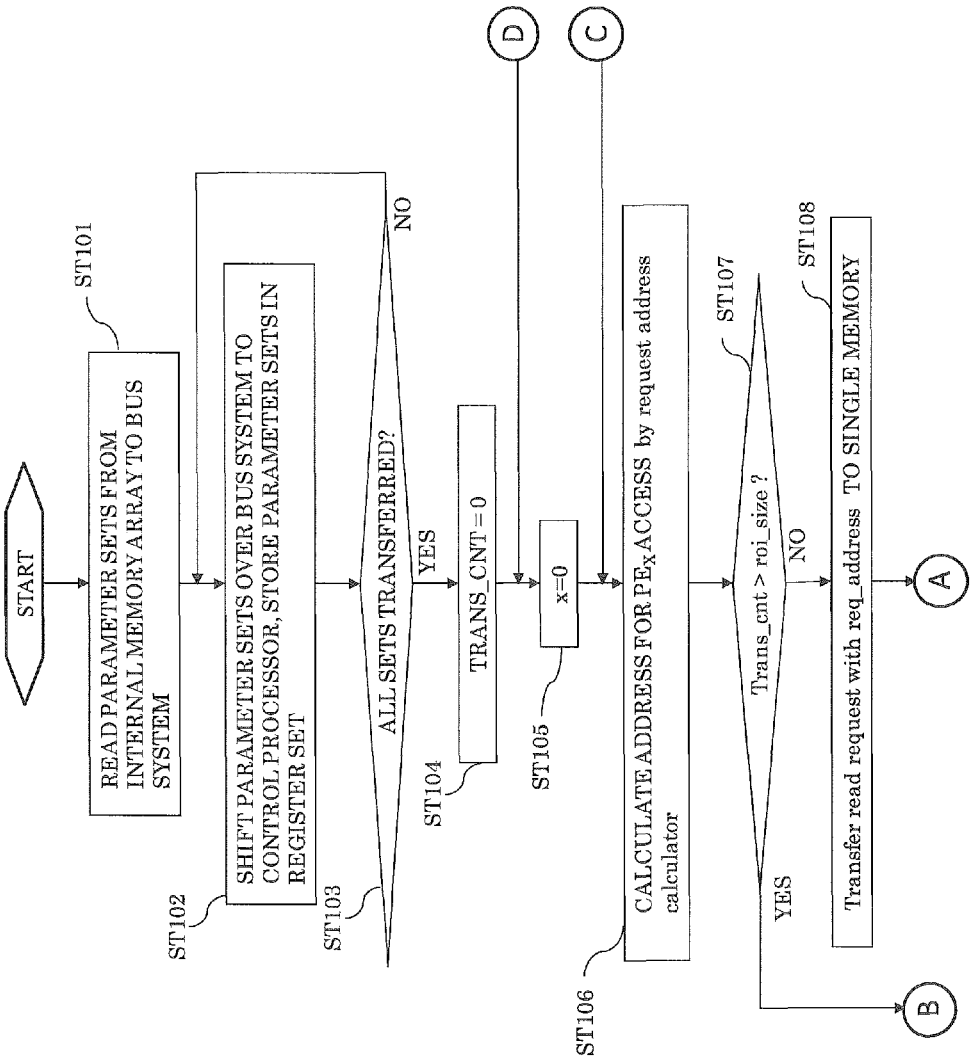
FIG. 6A shows the flowchart for the read direction data transfer from the single memory 308 to the internal memory array.
Figure 6B:
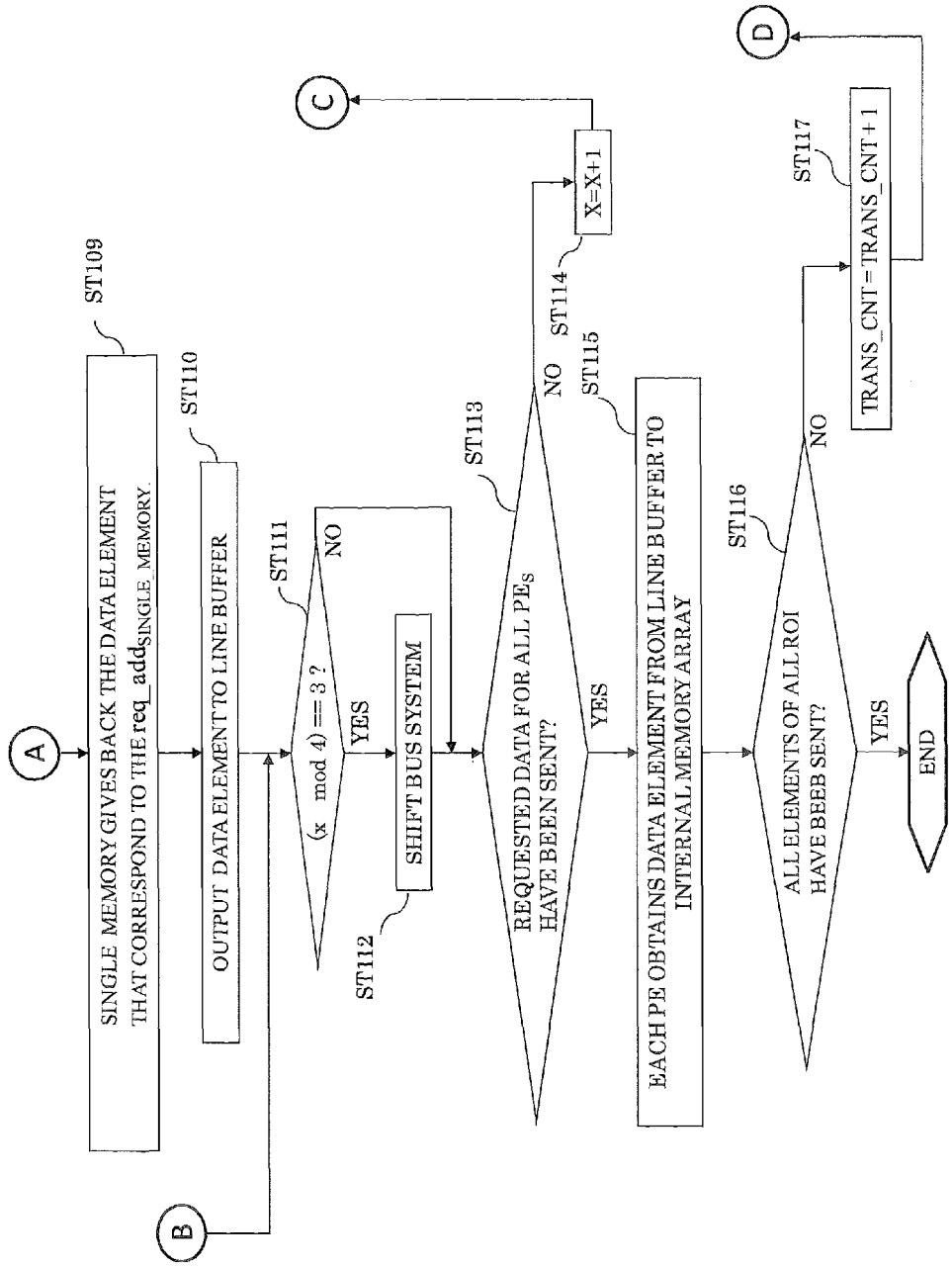
FIG. 6B shows the flowchart for the read direction data transfer from the single memory 308 to the internal memory array.

Firstly, referring to FIG. 6A and FIG. 6B, we would like to describe the data transfer operation of read direction.

FIG. 6A and FIG. 6B show the flowchart for the read direction data transfer from the single memory 308 to the internal memory array.

Figure 7:
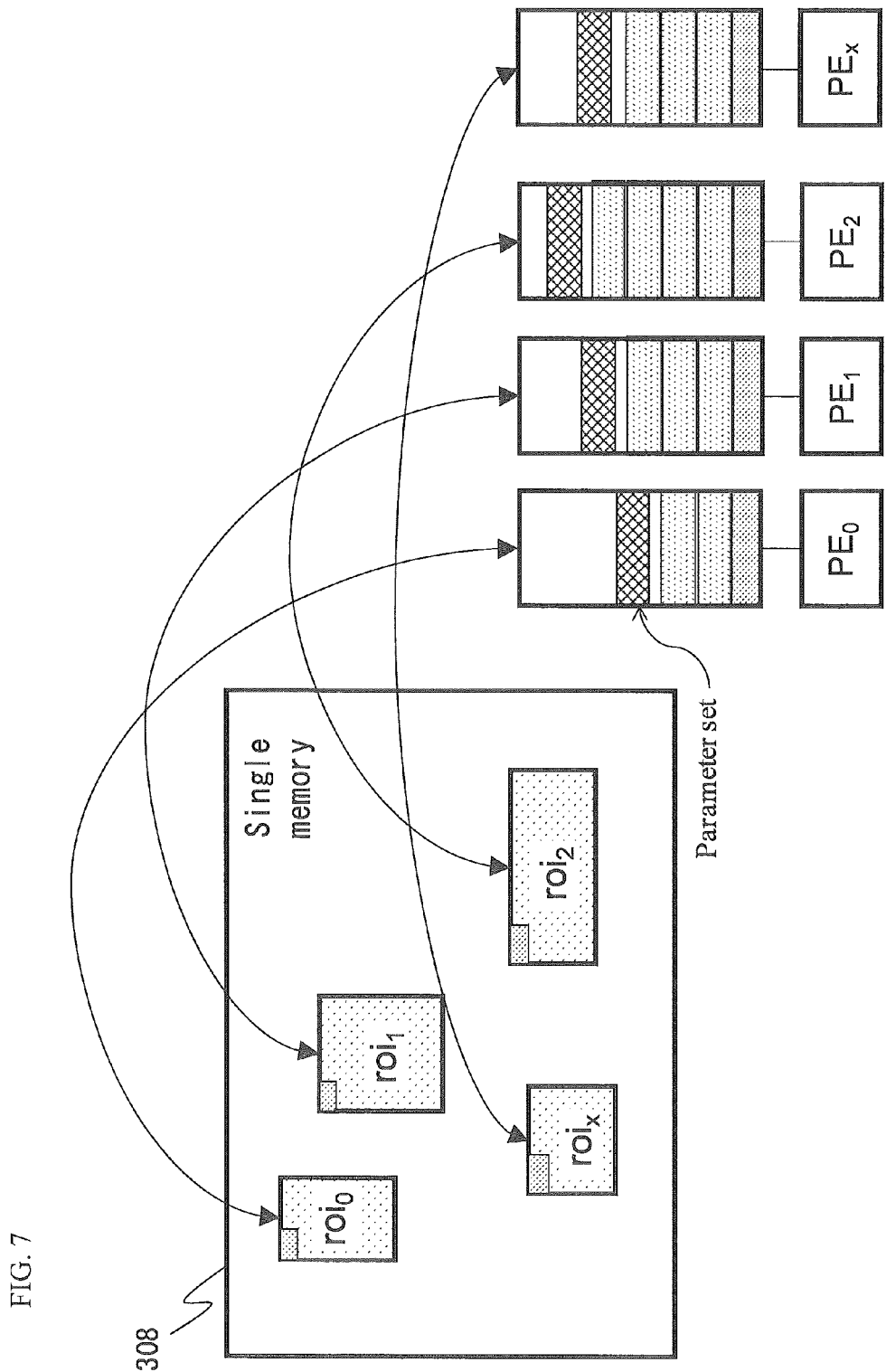
FIG. 7 illustrates a number of ROIs that are different size each other and are to be transferred to the internal memory array.

Suppose that some regions are detected as possible candidates by preliminary analysis, as shown in FIG. 7.

In FIG. 7, $ROI_0$, $ROI_1$, ... $ROI_x$, ... are possible candidates and should be analyzed more precisely. So these regions should be transferred to the internal memories respectively.

Also, suppose that when some regions are detected as possible candidates at the preliminary analysis, parameter sets for each ROI area are specified and each PE holds ROI parameter sets for their own assigned ROI areas respectively.

Each PE may store the ROI parameter sets in their own internal memory 302.

At ST101, firstly, the ROI parameter sets for all ROI areas are read out in parallel from the internal memory array and stored to the line buffers LB of the bus system 305.

Then, at ST102, the parameter sets are shifted to the control processor 307 and stored into the register set unit 309 as shown in FIG. 2.

After all parameter sets are stored inside the register set unit 309 (ST103: YES), the ROI transfer counter 601 is initialized with "0" (trans_cnt=0) (ST104).

Also the internal counter of the bus shift controller 312 is initialized to be "0" (ST105).

Next, for PEx, request address of data to be transferred is calculated by the request address calculator (ST106).

"x" corresponds index number of PE or ROI, and, starting from "0", "x" is counted up every loop.

Request address calculation has been already described referring to FIG. 3 and FIG. 4. We hence redescribe here only the equation:

$$req\_add_{single\_memory} = start\_add_{single\_memory} + (ver\_pos \times dist) + hor\_pos$$

$$ver\_pos = trans\_cnt \ div \ roi\_width$$

$$hor\_pos = trans\_cnt \ mod \ roi\_width$$

After $req\_add_{single\_memory}$ for the PEx has been calculated, this calculated $req\_add_{single\_memory}$ for the PEx is transferred to the single memory 308 via the transfer gate unit 311 (ST108).

However, as described above, while necessary request addresses are provided to the single memory 308, needless request addresses are not transferred to the single memory 308. Therefore, before sending the request address to the single memory (ST108), it is determined, whether trans cnt is smaller than roi_size or not (ST106).

When the single memory 308 receives $req\_add_{single\_memory}$, the single memory 308 gives back the data elements that correspond to the $req\_add_{single\_memory}$ (ST109). And the CP 307 output the data element to the line buffer 306 (ST110).

As described above, the bus system should be shifted every four data (ST111, ST112).

Next, at ST113, it is determined whether x reaches the last number of PE index, that is, it is determined whether the address calculation (ST106) and outputting necessary data element to the line buffer have been carried out for one element from every PE ($PE_0$-$PE_{N-1}$).

When "x" does not reach the last number, as counting up "x" (ST114), the process goes back to the address calculation (ST106) and repeats the process from ST106 to ST113.

That is, the address calculation (ST106) for next PE (for example, $PE_1$) is performed and the requested data is output to the line buffer.

Meanwhile, when "x" reaches the last number at ST113, data for all PEs have been output to the line buffers. For example, in the case trans_cnt=0, all first data that correspond to start address data for each ROI are output to the line buffer. Therefore, each PE obtains assigned data element from the line buffer and stores them to their own internal memory (ST115).

Figure 8:
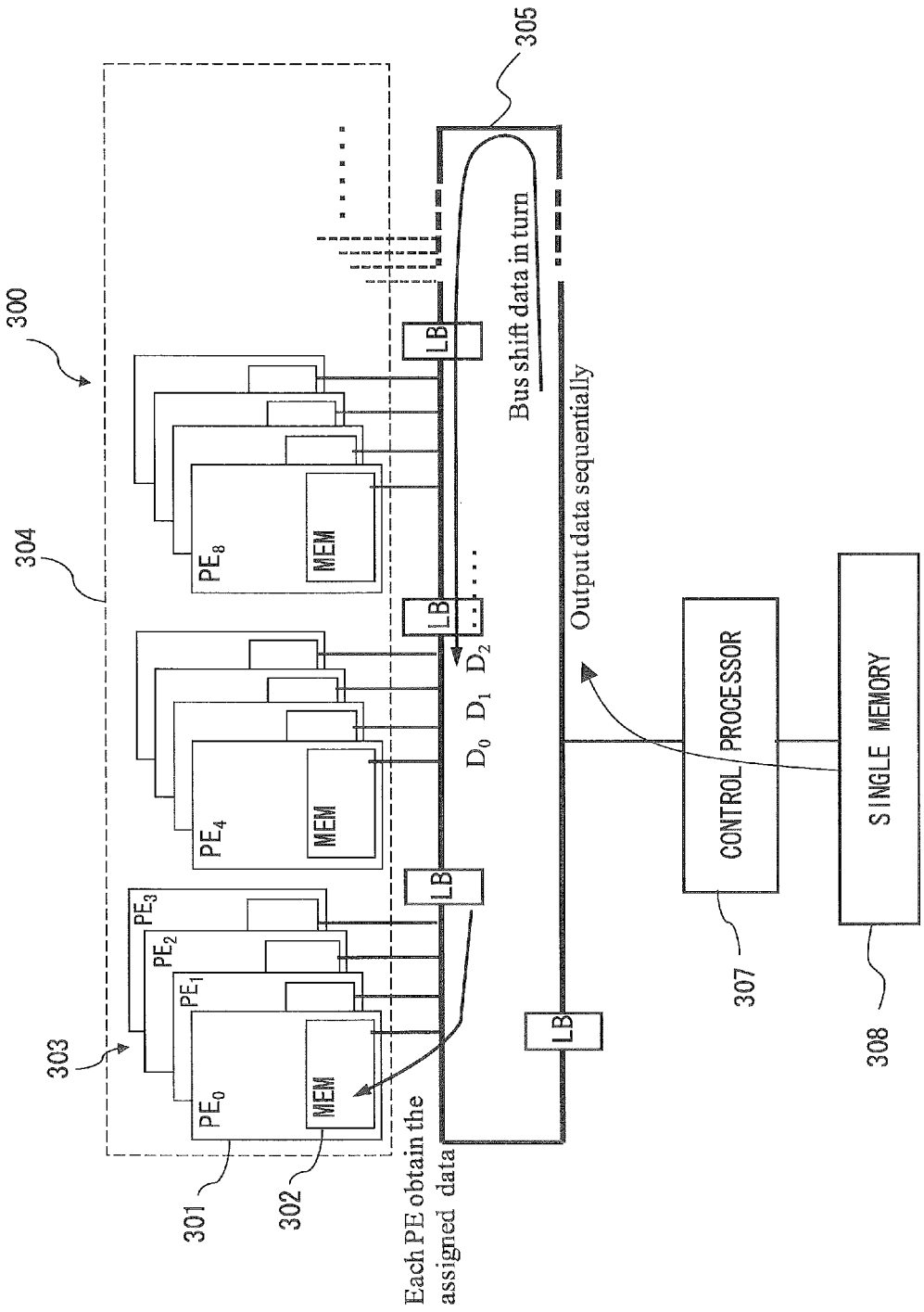
FIG. 8 shows the data transfer operation in the first embodiment schematically.

This process may be understood referring to FIG. 8. When all first data are stored in the line buffers, then each PE obtains assigned data element from the line buffer.

Until all elements of all ROIs have been sent (ST116), ST106 to ST115 are repeated as counting up the trans_cnt (ST117).

As described above referring to FIG. 4, it is easily understood that when counting up the trans_cnt by 1, the position of the request address is shifted by one inside the ROI. Therefore, by repeating ST105 to ST117, all elements of all ROIs can be output from the single memory to the bus system and each PE can obtain assigned ROI data sequentially.

Furthermore, because the transfer gate unit determines whether the trans_cnt is smaller than roi_size or not for every PEx (or ROIx), needless data is not sent to the single memory. Therefore, a concurrent data transfer of multiple ROI in an SIMD processor system can be performed fast and efficient.

(Second Embodiment)

Next we would like to describe the second embodiment of the present invention.

As this second embodiment, we would like to describe the data transfer operation for write direction.

The system configuration described in the first embodiment can be applicable as well to this second embodiment.

Figure 9A:
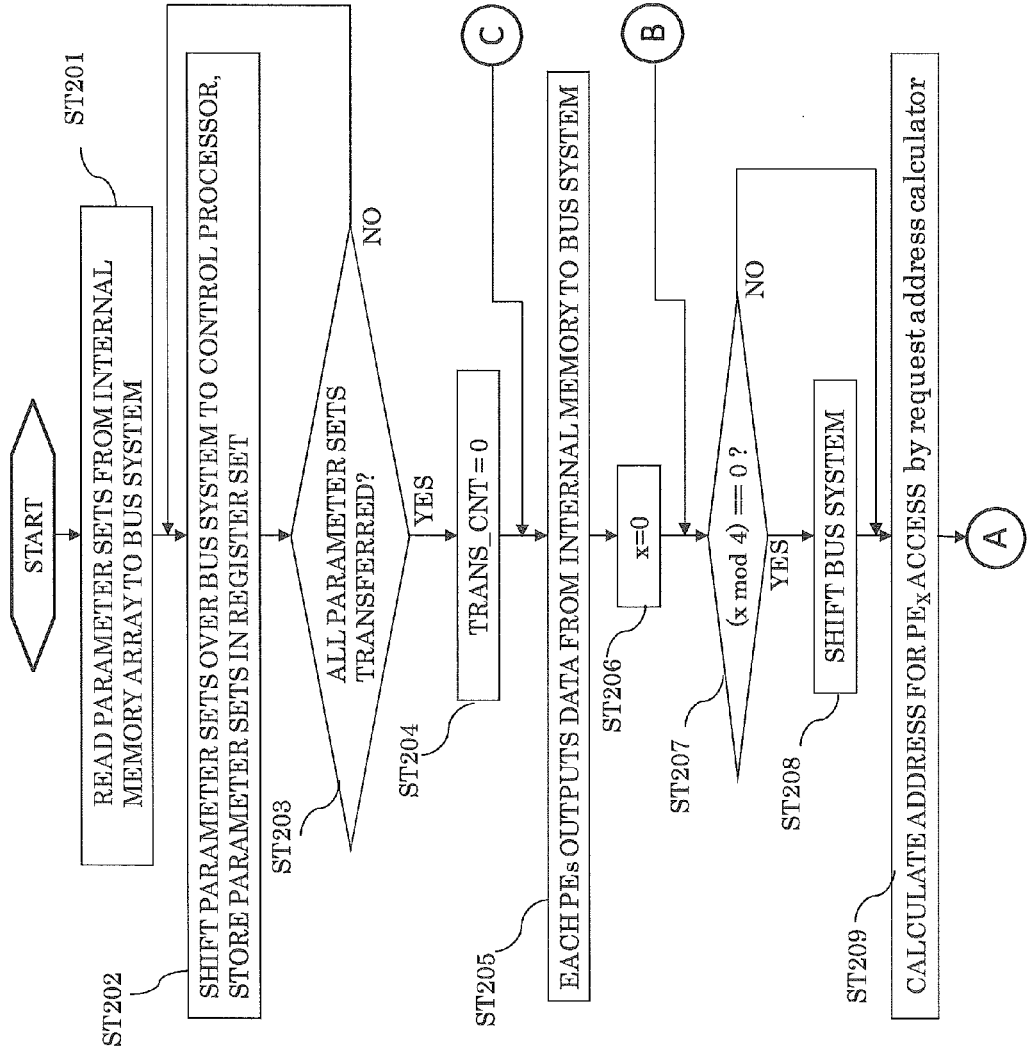
FIG. 9A shows the flowchart for the write direction data transfer from the internal memory array to the single memory 308.
Figure 9B:
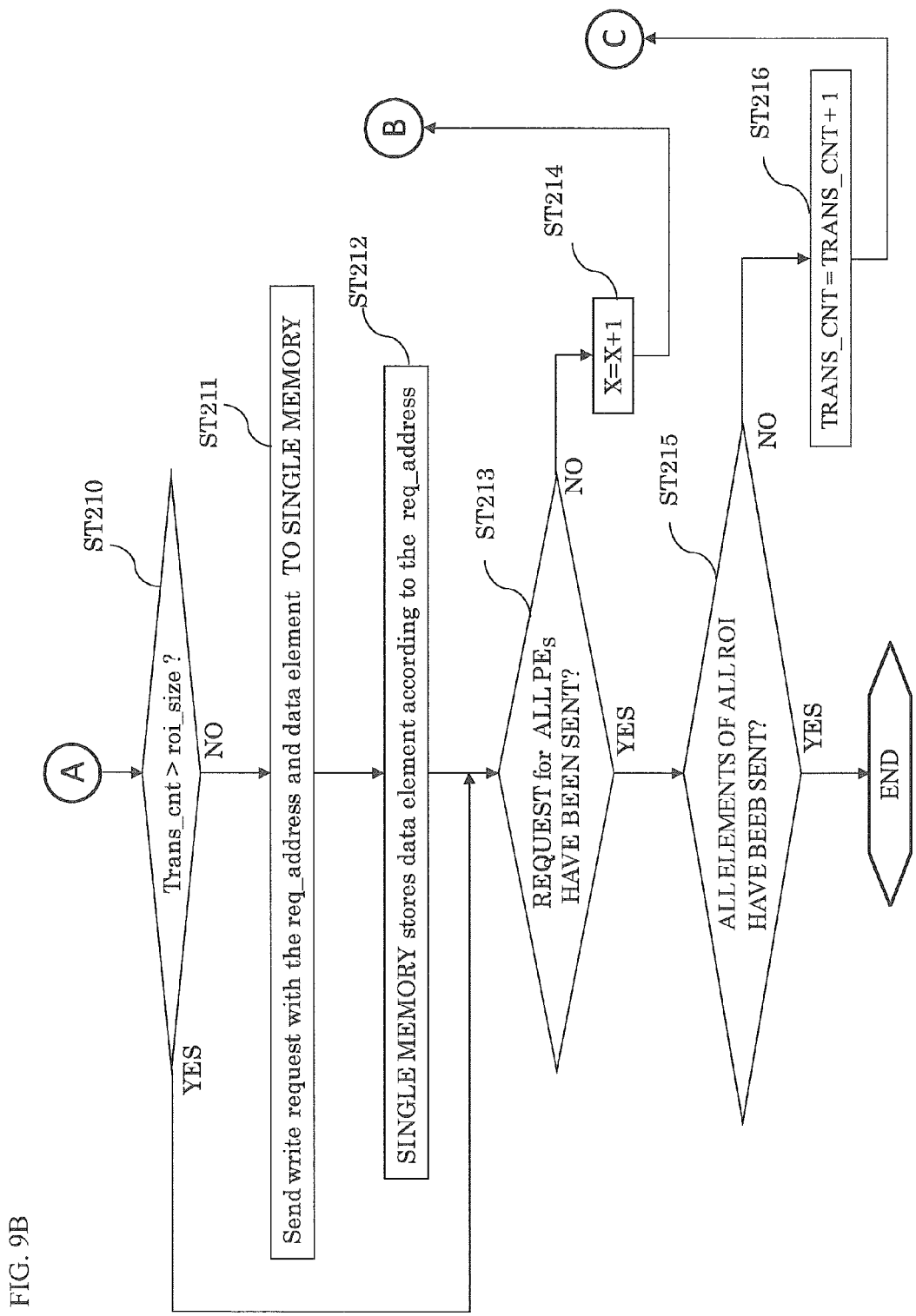
FIG. 9B shows the flowchart for the write direction data transfer from the internal memory array to the single memory 308.

FIG. 9A and FIG. 9B show the flowchart for the write direction data transfer from the internal memory array to the single memory 308.

Figure 10:
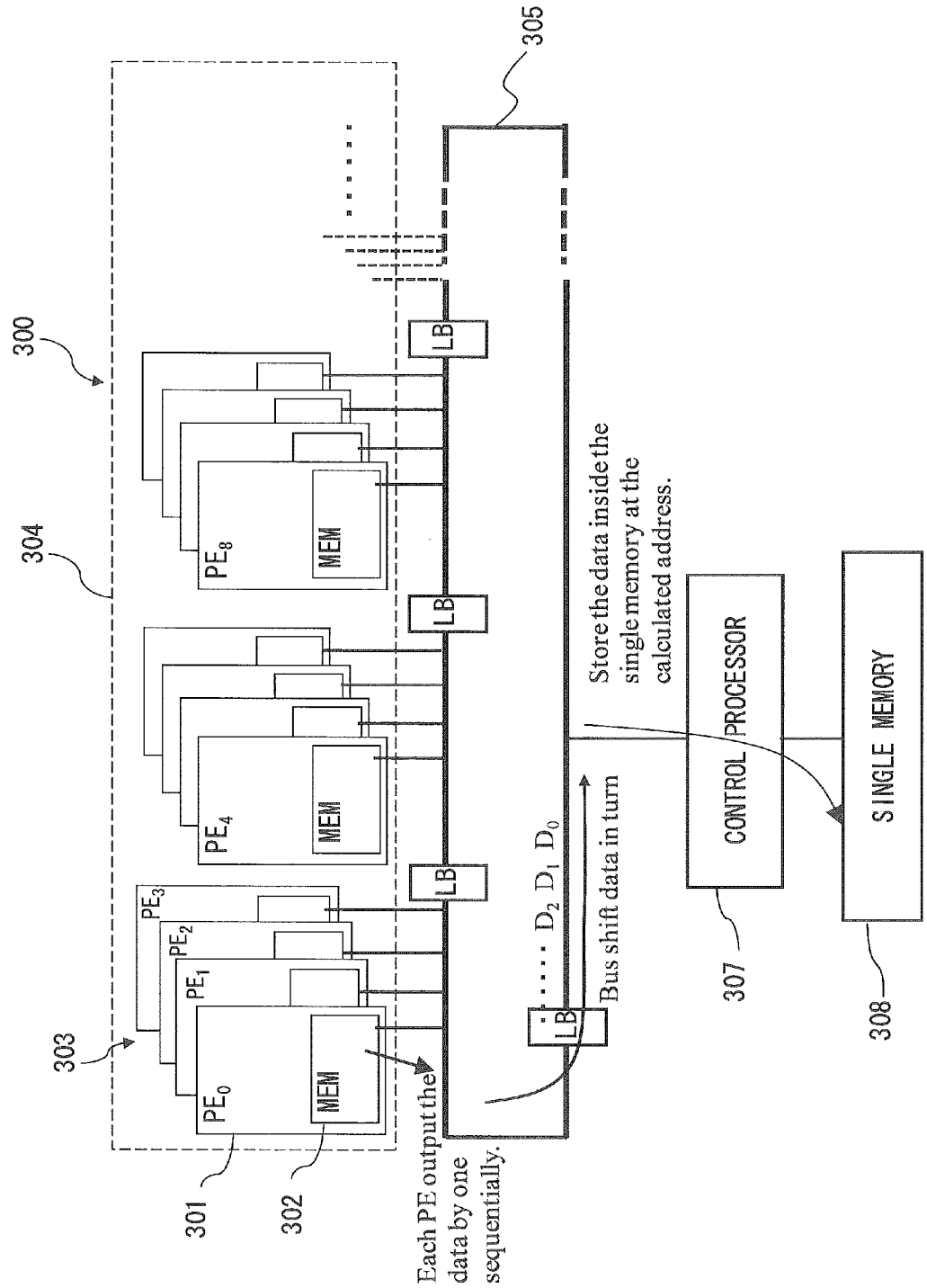
FIG. 10 shows the data transfer operation in the second embodiment schematically.

FIG. 10 shows the data transfer operation in the second embodiment schematically.

ST201-ST204 are identical to ST101-ST104.

At ST205, the first data element for each ROI area are read from the internal memories and stored to the line buffers of the bus system. At this step, all PEs output one element data to the line buffers. Once the internal bus shift controller 312 is initialize to be "0" and then as described above, the bus system should be shifted every four data (ST207, ST208).

At ST209, for PEx, request address of data to be written is calculated by the request address calculator (ST209). This arithmetic is identical to ST 106 of the first embodiment.

Further on, depending on whether trans_cnt is smaller than roi_size or not (ST210), write request as well as the req_address and data transferred from PEx are sent to the single memory (ST211). Following that, the single memory stores the data element sent from the PEx at the requested address (ST212).

As counting up "x" (ST214), the process goes back to the bus shift control (ST207, ST208) and the address calculation (ST209), and repeats the process from ST207 to ST213.

At ST213, it is determined whether the address calculation (ST209) and storing the data element at the requested address have been carried out for one element from every PE ($PE_0$-$PE_{N-1}$). When "x" reaches the last number of PEs, until all elements of all ROIs have been written back to the single memory, ST205 to ST215 are repeated as counting up the trans_cnt (ST216).

Eventually, all ROIs data have been written back to the single memory.

Even though ROI sizes are different from ROI to ROI, by the address calculation (ST209), the CP can specify the data to be written back inside the single memory.

Furthermore, because the transfer gate unit determines whether the trans cnt is smaller than roi_size or not for every PEx (or ROIx), needless write request is not sent to the single memory.

Therefore, a concurrent data transfer of multiple regions of interest in an SIMD processor system can be performed fast and efficient.

(Modified Embodiment 1)

As a modified embodiment, we would like to describe an alternative architecture for the request address calculator 310.

Figure 11:
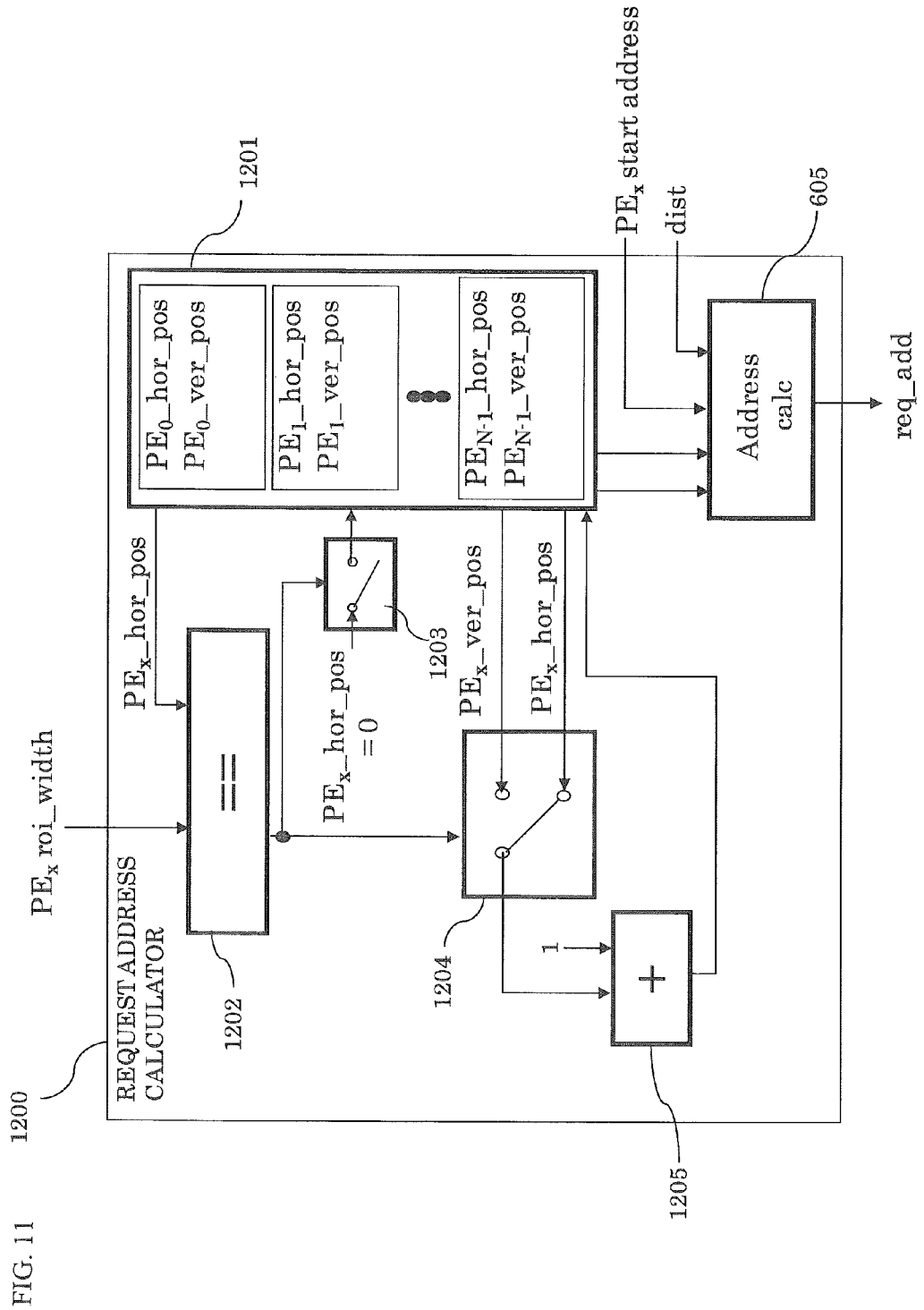
FIG. 11 shows the modified address calculator 1200.

FIG. 11 shows the modified address calculator 1200.

This address calculator 1200 has a comparator 1202, two switches 1203, 1204, a register set 1201 and an adder unit 1205.

The register set 1201 has a number of registers; and two registers are provided for each PEx. The registers are capable of temporary holding a current horizontal position hor_pos and current vertical position ver_pos of the data to be transferred.

At the begging, PEx hor_pos and ver_pos are set to be "0".

For each PEx, the comparator 1202 compares the current horizontal position hor_pos from the register set 1201 with the horizontal width−1 of PEx.

The comparator 1202 outputs the comparison result to the switch 1204 and the switch 1203.

PEx ver_pos and PEx hor_pos are input to two input terminals of the switch 1204 respectively and the switch 1204 selects either PEx ver_pos or PEx hor_pos as the output value.

Specifically, when the current PEx hor_pos is not equal to the horizontal width −1 of PEx, the switch 1204 selects the current PEx hor_pos as the output value.

The output value from the switch 1204 is input to the adder unit 1205; the output value from the switch 1204 is increased by 1. Following that, the result of the addition is written back to the register of the register set 1201.

In other words, as each step goes, the value of PEx hor_pos is increased by 1, which is equivalent to that the data position inside the ROI is shift horizontally by 1.

On the other hand, when the current PEx hor_pos is equal to the horizontal width_minus 1 of PEx, the comparator 1202 outputs the result to the switch 1203. This switch 1203 has the function to reset the value of the horizontal position hor_pos; specifically, the value of the PEx hor_pos is reset to be "0" and value "0" is written back to the register of the register set 1201. And the comparison result is also output to the switch 1205.

When the current PEx hor_pos is equal to the horizontal width minus 1 of PEx, the switch selects the vertical position ver_pos as the output value, which value is increased in the adder unit 1205 by 1. The result of the addition is written back to the register of the register set 1201.

In other words, when the data position inside the ROI reaches the end of ROIx in horizontal direction, the data position is shifted to the head of the next row.

In this way data position can be shifted in good order.

Therefore, the req_add$_{single\_memory}$ which is calculate from ver_pos and hor_pos can be shifted in good order in the single memory addressing area.

(Modified Embodiment 2)

This invention is not limited to the embodiment described above.

Figure 12:
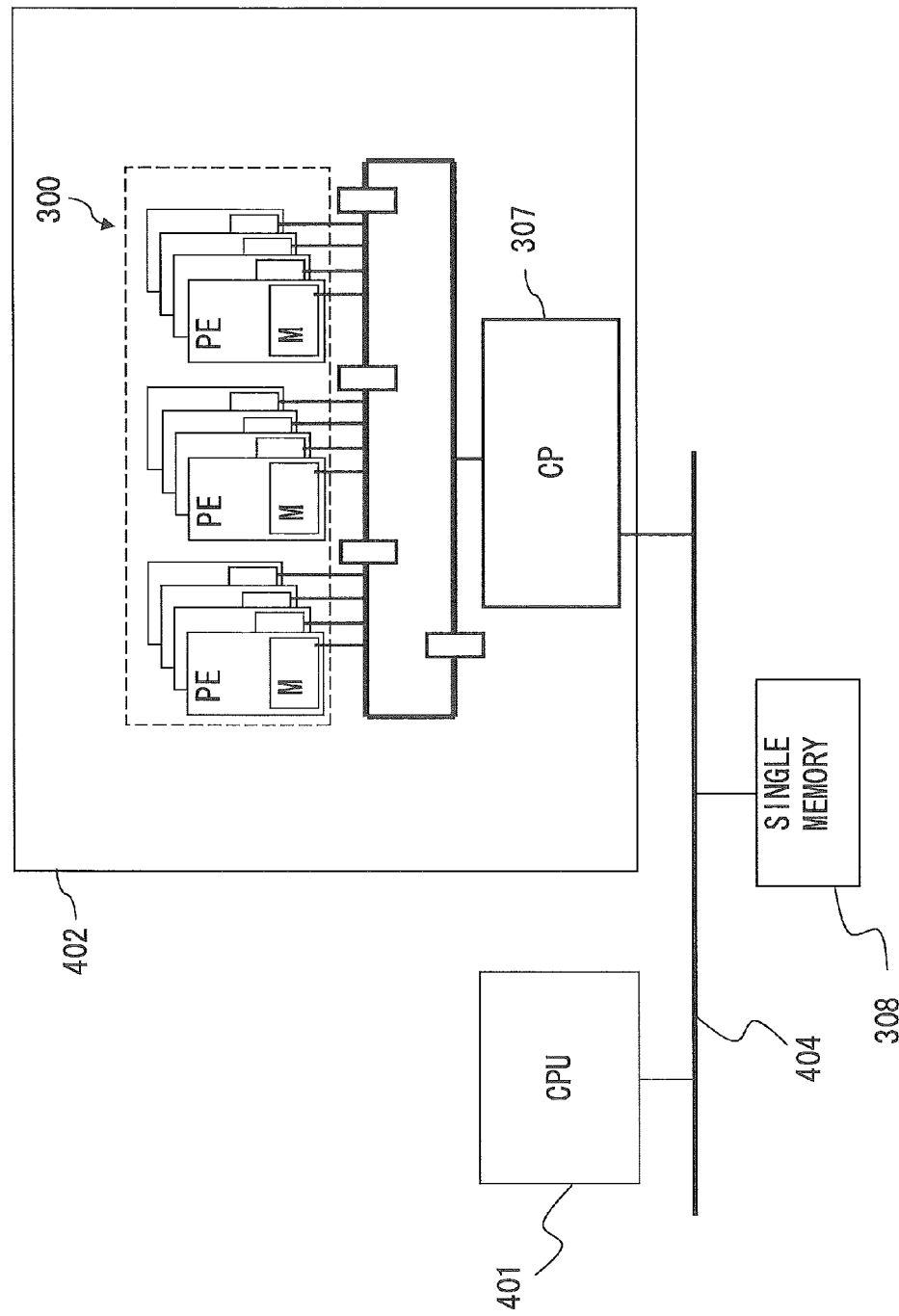
FIG. 12 shows a possible system design in which the SIMD processor 300 with the example architecture could operate.
Figure 13:
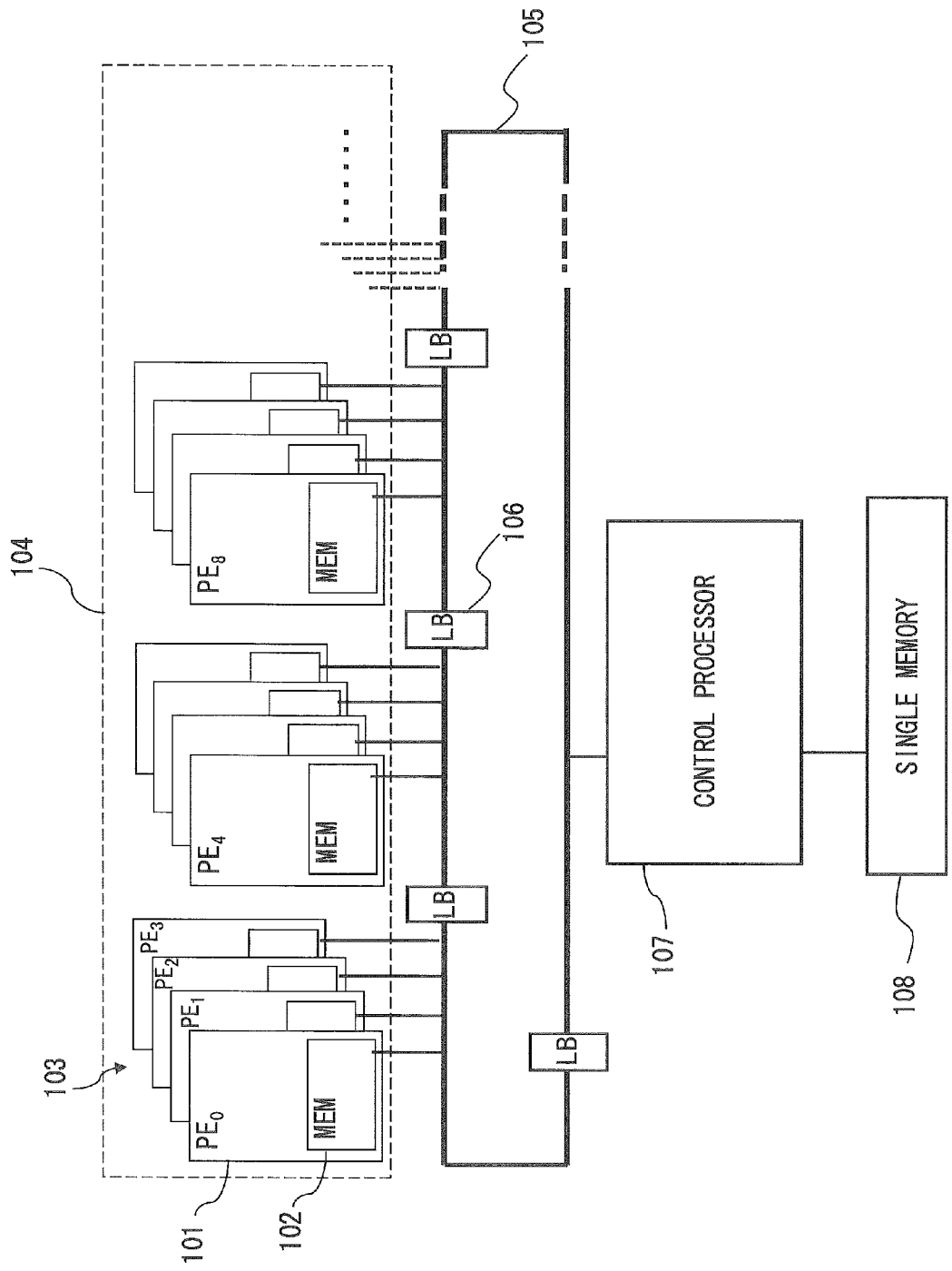
FIG. 13 shows a typical architecture of the SIMD processor.
Figure 14:
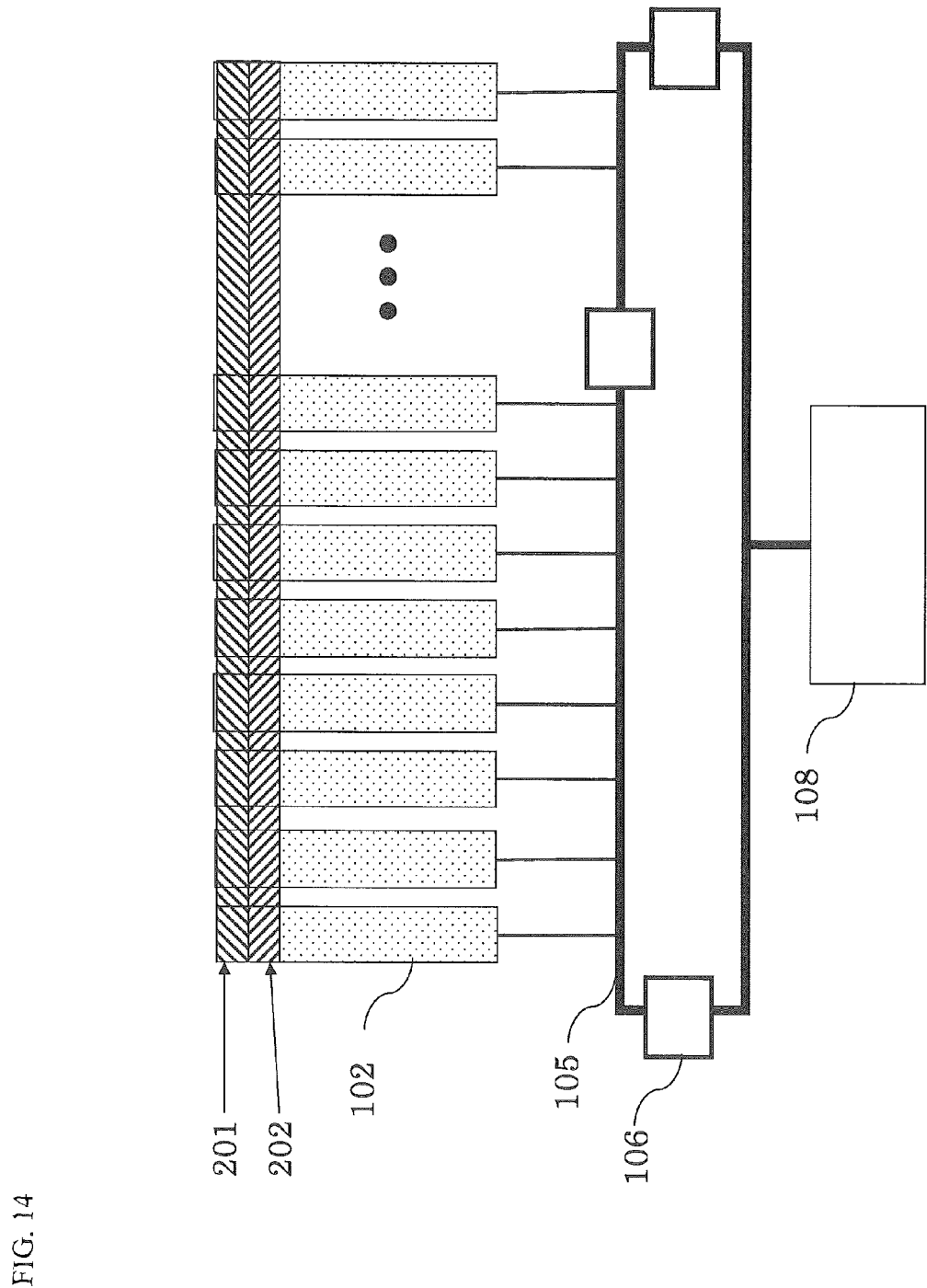
FIG. 14 shows an operation of line transfer, where an autonomous DMA operation is used in NPTL 1.
Figure 15:
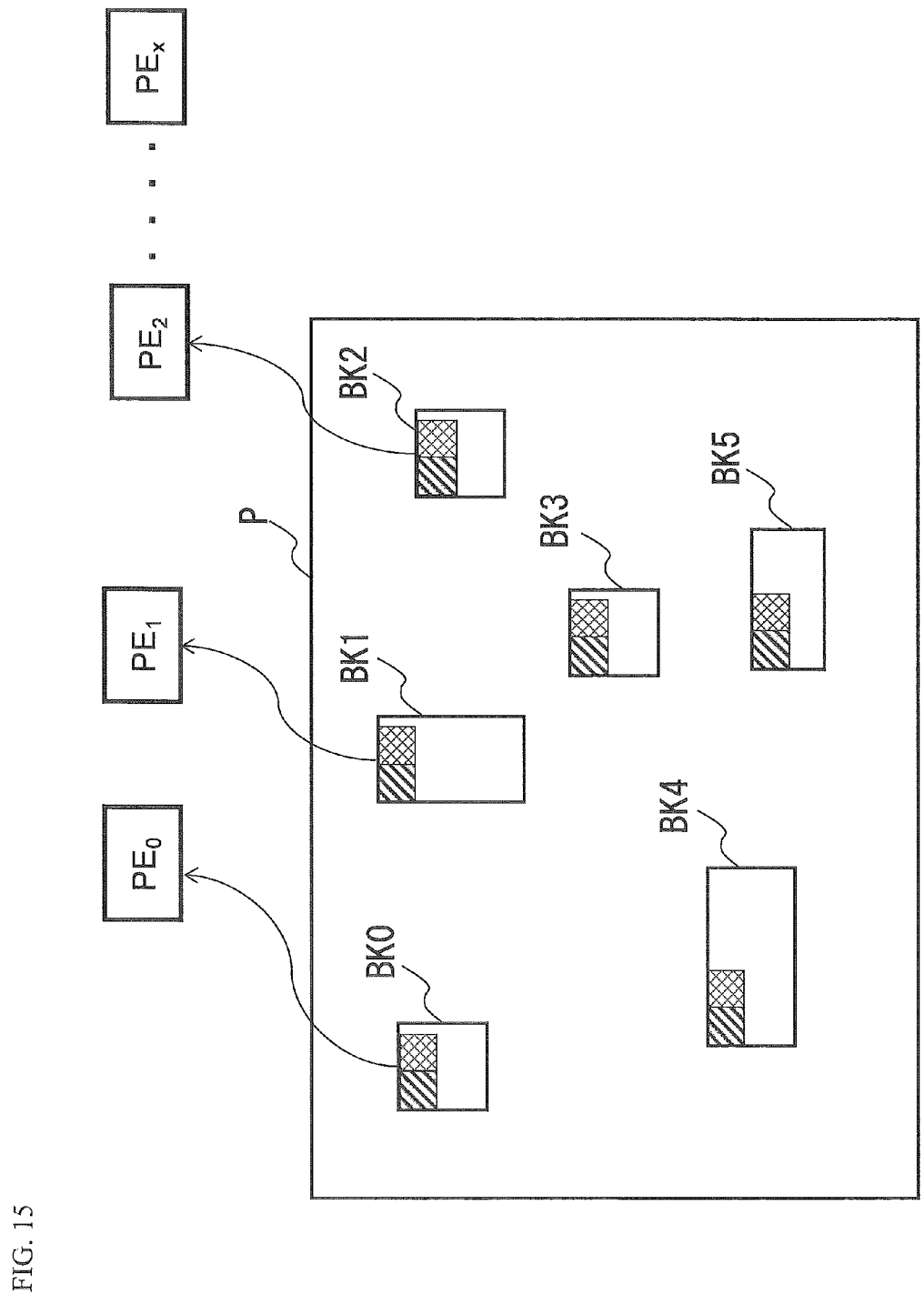
FIG. 15 shows a case that BK1-BK6 are ROIs that should be transferred to each assigned PE in the related art.
Figure 16:
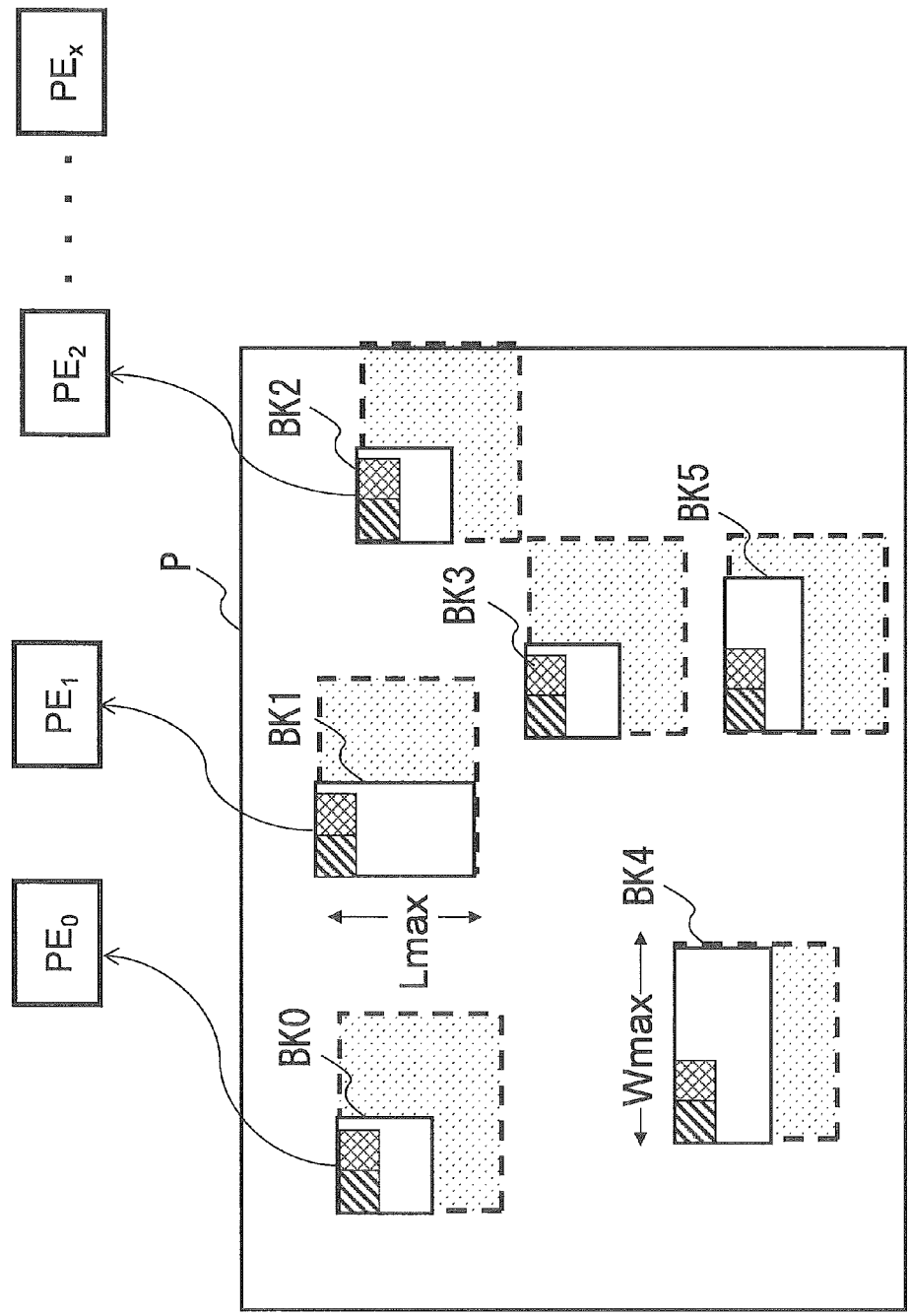
FIG. 16 shows a technical problem of the related art.

FIG. 12 shows a possible system design in which the SIMD processor 300 with the example architecture could operate.

Other units inside the system could be a central processing unit (CPU) 401 and a single memory element 308, which are all connected over connections to a bus system 404.

It will be understood by those of ordinary skill in the art that various changes in form and details may be made therein without departing from the spirit and scope of the present invention as defined by the claims.

The sizes of the ROIs may be different from each other, or may be the same as each other.

In the above embodiment, because the PEs are grouped by four, the shift operation of the bus is controlled by the result of arithmetic calculation modulo 4.

However, the bus shift should be properly controlled depending on the number of PEs of one group.

INDUSTRIAL APPLICABILITY

The present invention can be applied to a method and an apparatus for an image processing, and the image data can be acquired with a camera, a laser probe, or an internet.

REFERENCE SIGNS LIST

101: processor element (PE)
102: memory element (internal memory)
103: PE group
104: PE array
105: bus
106: line buffer
107: control processor (CP)
108: External memory
301: processor element (PE)
302: memory element (internal memory)
303: group of PE
304: PE array
305: bus system
306: register
307: control processor (CP)
308: single memory
309: register set
310: request address calculator
311: transfer gate
401: central processing unit
402: SIMD processor
403: single memory
404: bus system
601: transfer counter trans_cnt
602: adder unit
603: integer division unit
604: modulo unit
605: address calculation unit
701: multiplication unit
702: comparator
703: switch
1201: register set
1202: comparator
1203: switch
1204: switch
1205: adder unit

The invention claimed is:

1. A data transfer apparatus comprising:
a processing element array that comprises multiple processing elements controlled in a Single Instruction Multiple Data style;
memory elements that are provided inside each of the processing elements, data access to all the memory elements of the processing elements being done in parallel;
a control processor controlling the processing element array in the Single Instruction Multiple Data style;
a bus system connecting all of the processing elements with each other and with the control processor; and
a single memory that exchanges data with the memory elements of the processing element array, the single memory acting as data source for a read transfer and as a data sink for a write transfer,
wherein the control processor comprises;
a register set unit having a number of registers, each of which is temporary storage of Region Of Interest (ROI) transfer parameter set for each processing element to provide an adjustable ROI area, the transfer parameter set including at least a ROI start address inside the single memory, the width of ROI and the height of ROI; and
a request address calculator that firstly shifts a position of data to be transferred horizontally and vertically inside the each ROI by adding 1 and secondly calculates the address of the position inside the single memory, using the ROI start address and a common distance that is the width of a memory region of the single memory, in addition to said vertical and horizontal position.

2. The data transfer apparatus according to claim 1, wherein the vertical position is calculated by an integer division in which the number of data transfer count is divided by the width of the ROI, and the horizontal position is calculated by a modulo operation in which the number of data transfer count is divided by the width of the ROI.

3. The data transfer apparatus according to claim 1, wherein the address of the position inside the single memory is calculated using the following equation.

$$\text{req\_add}_{single\_memory} = \text{start\_add}_{single\_memory} + (\text{ver\_pos} \times \text{dist}) + \text{hor\_pos}$$

where the req_add$_{single\_memory}$ is the address of the position inside the single memory,
the start_add$_{single\_memory}$ is the start address of the ROI inside the single memory,
the ver_pos is the vertical position of the data inside the ROI and the hor_pos is the horizontal position of the data inside the ROI,
dist is the common distance.

4. The data transfer apparatus according to claim 1, wherein the control processor further comprises a transfer gate unit, and the transfer gate unit allows passage of a memory access request to the single memory only when the number of data transfer count does not exceed the size of ROI.

5. The data transfer apparatus according to claim 1, wherein the sizes of the ROI areas from the array of processing elements are same.

6. The data transfer apparatus according to claim 1, wherein the sizes of the ROI areas from the array of processing elements are different.

7. The data transfer apparatus according to claim 1, where the bus system comprises a pipelined ring bus.

8. The data transfer apparatus according to claim 1, where the single memory comprises an external memory.

9. The data transfer method according to claim 1, where the single memory comprises an external memory.

10. A data transfer method for transferring data between a processing element array that comprises multiple processing elements with own memory element and a single memory in parallel processing, the data transfer method comprising:
    storing each of Region Of Interest (ROI) transfer parameter set for each processing element to provide an adjustable ROI area, the transfer parameter set including at least a ROI start address inside the single memory, the width of ROI and the height of ROI;
    calculating a position of data to be transferred inside the ROI by shifting the position of data horizontally and vertically inside the each ROI by adding 1, and
    calculating the address of the position inside the single memory by using the ROI start address and a common distance that is the width of a memory region of the single memory, in addition to said vertical and horizontal position.

11. The data transfer method according to claim 10, wherein the vertical position is calculated by an integer division in which the number of data transfer count is divided by the width of the ROI, and the horizontal position is calculated by a modulo operation in which the number of data transfer count is divided by the width of the ROI.

12. The data transfer method according to claim 10, wherein the address of the position inside the single memory is calculated using the following equation.

$$\text{req\_add}_{single\_memory} = \text{start\_add}_{single\_memory} + (\text{ver\_pos} \times \text{dist}) + \text{hor\_pos}$$

where the req_add$_{single\_memory}$ is the address of the position inside the single memory,
the start_add$_{single\_memory}$ is the start address of the ROI inside the single memory,
the ver_pos is the vertical position of the data inside the ROI and the hor_pos is the horizontal position of the data inside the ROI,
dist is the common distance.

13. The data transfer method according to claim 10, wherein the control processor further comprises a transfer gate unit, and the transfer gate unit allows passage of a memory access request to the single memory only when the number of data transfer count does not exceed the size of ROI.

14. The data transfer method according to claim 10, wherein the sizes of the ROI areas from the array of processing elements are same.

15. The data transfer method according to claim 10, wherein the sizes of the ROI areas from the array of processing elements are different.

16. A data transfer apparatus comprising:
    a processing element array that comprises multiple processing elements;
    memory elements that are provided inside each of the processing elements, data access to all the memory elements of the processing elements being done in parallel;
    a control processor controlling the processing element array;
    a bus system connecting all of the processing elements with each other and with the control processor; and
    a single memory that exchanges data with the memory elements of the processing element array, the single memory acting as data source for a read transfer and as a data sink for a write transfer,
    wherein the control processor comprises;
    a register set unit having a number of registers, each of which is temporary storage of Region Of Interest (ROI) transfer parameter set for each processing element to provide an adjustable ROI area, the transfer parameter set including at least a ROI start address inside the single memory, the width of ROI and the height of ROI; and
    a request address calculator that firstly shifts a position of data to be transferred horizontally and/or vertically inside the each ROI by adding 1 and secondly calculates the address of the position inside the single memory, using the ROI start address and a common distance that is the width of a memory region of the single memory, in addition to said vertical and horizontal position.

17. The data transfer apparatus according to claim 16, wherein the vertical position is calculated by an integer division in which the number of data transfer count is divided by the width of the ROI, and the horizontal position is calculated by a modulo operation in which the number of data transfer count is divided by the width of the ROI.

18. The data transfer apparatus according to claim 16, wherein the address of the position inside the single memory is calculated using the following equation.

$$\text{req\_add}_{single\_memory} = \text{start\_add}_{single\_memory} + (\text{ver\_pos} \times \text{dist}) + \text{hor\_pos}$$

where the req_add$_{single\_memory}$ is the address of the position inside the single memory,
the start_add$_{single\_memory}$ is the start address of the ROI inside the single memory,
the ver_pos is the vertical position of the data inside the ROI and the hor_pos is the horizontal position of the data inside the ROI,
dist is the common distance.

19. The data transfer apparatus according to claim 16, wherein the control processor further comprises a transfer gate unit, and the transfer gate unit allows passage of a memory access request to the single memory only when the number of data transfer count does not exceed the size of ROI.

20. The data transfer apparatus according to claim 16, wherein the sizes of the ROI areas from the array of processing elements are different, and
    where the single memory comprises an external memory.

* * * * *